United States Patent
Bartolucci et al.

(10) Patent No.: US 12,028,322 B2
(45) Date of Patent: Jul. 2, 2024

(54) COMPUTER-IMPLEMENTED SYSTEM AND METHODS FOR OFF-CHAIN EXCHANGE OF TRANSACTIONS PERTAINING TO A DISTRIBUTED LEDGER

(71) Applicant: nChain Licensing AG, Zug (CH)

(72) Inventors: Silvia Bartolucci, London (GB); Pauline Bernat, London (GB)

(73) Assignee: nChain Licensing AG, Zug (CH)

( * ) Notice: Subject to any disclaimer, the term of this patent is extended or adjusted under 35 U.S.C. 154(b) by 627 days.

(21) Appl. No.: 17/257,805

(22) PCT Filed: Jul. 3, 2019

(86) PCT No.: PCT/IB2019/055680
§ 371 (c)(1),
(2) Date: Jan. 4, 2021

(87) PCT Pub. No.: WO2020/008388
PCT Pub. Date: Jan. 9, 2020

(65) Prior Publication Data
US 2021/0297397 A1   Sep. 23, 2021

(30) Foreign Application Priority Data
Jul. 4, 2018 (GB) ..................................... 1810981

(51) Int. Cl.
*H04L 29/06* (2006.01)
*G06F 16/23* (2019.01)
(Continued)

(52) U.S. Cl.
CPC ........ *H04L 63/061* (2013.01); *G06F 16/2365* (2019.01); *G06Q 20/108* (2013.01); *G06Q 20/401* (2013.01); *H04L 9/14* (2013.01)

(58) Field of Classification Search
CPC ..... H04L 63/061; H04L 9/14; G06F 16/2365; G06Q 20/108; G06Q 20/401
See application file for complete search history.

(56) References Cited

U.S. PATENT DOCUMENTS 7,096,494 B1 * 8/2006 Chen .................. G06Q 20/3672
380/278
7,187,771 B1 * 3/2007 Dickinson ............... H04L 63/06
380/228

(Continued)

OTHER PUBLICATIONS

Herrera-Joancomarti Jordi et al; Privacy in Bitcoin Transactions; New Challenges from Blockchain Scalability Solutions:, Sep. 8, 2016; p. 26-44. (Year: 2016).*

(Continued)

*Primary Examiner* — Yonas A Bayou
(74) *Attorney, Agent, or Firm* — Davis Wright Tremaine LLP

(57) ABSTRACT

This specification describes a system and method that enables multiple blockchain users to exchange their transactions before diffusion over the blockchain network in order to blur the link between the IP address of the transaction generated by a user and the user's blockchain address in the transaction. The system and method provides a technical solution to exchange transactions directly off-chain. Participants in the method agree to make deposits and alter their transaction in such a way that a refund and compensation scheme put in place automatically relies on the confirmations in the blockchain of the transactions exchanged among participants thus providing increased security as well as anonymity. The method scales for an arbitrary number (n>2) of participants.

23 Claims, 11 Drawing Sheets

(51) Int. Cl.
*G06Q 20/10* (2012.01)
*G06Q 20/40* (2012.01)
*H04L 9/14* (2006.01)
*H04L 9/40* (2022.01)

(56) References Cited

U.S. PATENT DOCUMENTS

| | | | | |
|---|---|---|---|---|
| 8,135,134 | B2* | 3/2012 | Orsini | H04L 63/0807 |
| | | | | 380/278 |
| 8,898,464 | B2* | 11/2014 | Bono | H04L 63/065 |
| | | | | 713/168 |
| 9,064,127 | B2* | 6/2015 | O'Hare | H04L 9/321 |
| 9,516,002 | B2* | 12/2016 | O'Hare | H04L 63/0272 |
| 9,733,849 | B2* | 8/2017 | O'Hare | G06F 3/0665 |
| 10,031,679 | B2* | 7/2018 | O'Hare | H04L 67/568 |
| 10,402,792 | B2* | 9/2019 | Lin | G06Q 20/3829 |
| 10,402,793 | B2* | 9/2019 | Haldenby | G06Q 40/128 |
| 11,126,975 | B2* | 9/2021 | Haldenby | H04L 9/0891 |
| 11,151,526 | B2* | 10/2021 | Haldenby | G06Q 10/063114 |
| 11,308,461 | B2* | 4/2022 | Haldenby | H04L 63/061 |

OTHER PUBLICATIONS

Antonopoulos, "Mastering Bitcoin—Unlocking Digital Cryptocurrencies," O'Reilly Media, Inc., Dec. 20, 2014, 282 pages.
Green et al., "Bolt: Anonymous Payment Channels for Decentralized Currencies," retrieved from https://eprint.iacr.org/2016/701.pdf, 2016, 32 pages.
Herrera-Joancomarti et al., "Privacy in Bitcoin Transactions: New Challenges from Blockchain Scalability Solutions," International Conference on Modeling Decisions for Artifical Intelligence, Sep. 8, 2016, 20 pages.
International Search Report and Written Opinion mailed Oct. 7, 2019, Patent Application No. PCT/IB2019/055680, 12 pages.
McCorry et al., "Towards Bitcoin Payment Networks," School of Computing Science, 2016, 20 pages.
Nakamoto, "Bitcoin: A Peer-to-Peer Electronic Cash System," Bitcoin, Oct. 31, 2008, https://bitcoin.org/bitcoin.pdf, 9 pages.
Poon et al., "The Bitcoin Lightning Network: Scalable Off-Chain Instant Payments," https://www.bitcoinlightning.com/wp-content/uploads/2018/03/lightning-network-paper.pdf, Jan. 14, 2016 [retrieved Dec. 10, 2018], 59 pages.
Satoshi et al., "Connection Limits," Bitcoin Forum, Aug. 9, 2010, https://bitcointalk.org/index.php?topic=741.0; prev_next=prev, 2 pages.
UK IPO Search Report mailed Dec. 14, 2018, Patent Application No. GB1810981.9, 8 pages.

* cited by examiner

```
OP_IF
    OP_2 <P¹_{i-1}> <P¹_i> OP_2 OP_CHECKMULTISIG #α_{i-1}
OP_ELSE
    <expiry time ΔT_E> OP_CHECKSEQUENCEVERIFY OP_DROP <P³_i> OP_CHECKSIG
OP_ENDIF
```

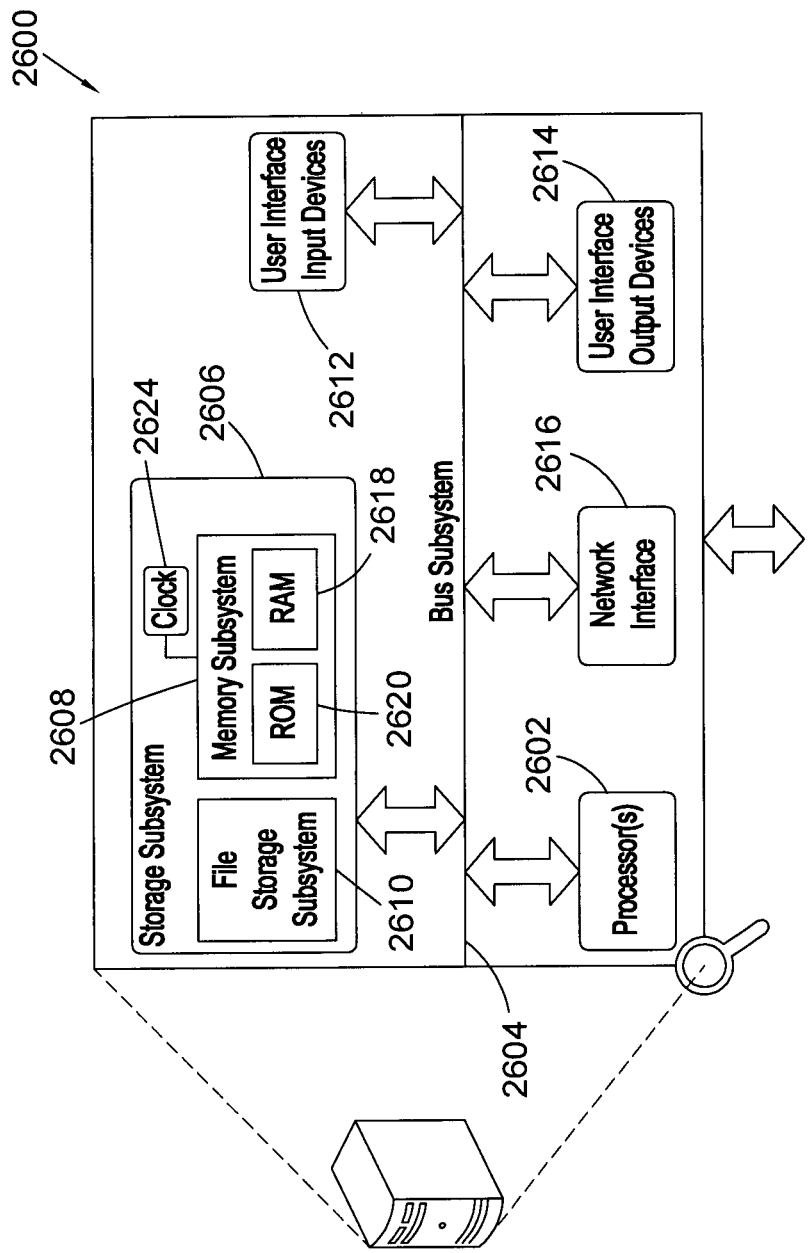

COMPUTER-IMPLEMENTED SYSTEM AND METHODS FOR OFF-CHAIN EXCHANGE OF TRANSACTIONS PERTAINING TO A DISTRIBUTED LEDGER

TECHNICAL FIELD

This disclosure relates generally to computer-implemented methods and systems suitable for exchanging transactions off-chain before submission of the transactions and their diffusion over a blockchain network. The disclosure is particularly suited, but not limited, to use with the Bitcoin blockchain.

BACKGROUND

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the disclosure is not limited to use with the Bitcoin blockchain and alternative blockchain implementations and protocols fall within the scope of the present disclosure.

A blockchain is a consensus-based, electronic ledger which is implemented as a computer-based, decentralised, distributed system made up of blocks which in turn are made up of transactions and other information. In the case of Bitcoin, each transaction is a data structure that encodes the transfer of control of a digital asset between participants in the blockchain system, and includes at least one input and at least one output. Each block contains a hash of the previous block to that blocks become chained together to create a permanent unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Some network nodes act as miners and perform work to ensure that each transaction is valid, with invalid transactions rejected from the network. For example, software clients installed on the nodes perform this validation work on transactions that reference unspent transaction outputs (UTXO). Validation may be performed by executing its locking and unlocking scripts. If execution of the locking and unlocking scripts evaluate to TRUE and, if certain other conditions are met, the transaction is valid and the transaction may be written to the blockchain. Thus, in order for a transaction to be written to the blockchain, it must be i) validated by a node that receives the transaction—if the transaction is validated, the node relays it to the other nodes in the network; and ii) added to a new block built by a miner; and iii) mined, i.e. added to the public ledger of past transactions. The transaction is considered to be confirmed when a sufficient number of blocks are added to the blockchain to make the transaction practically irreversible.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof record of events, distributed processing, etc.) while being more versatile in their applications.

One area of research is the use of the blockchain for the implementation of "smart contracts". These are computer programs designed to automate the execution of the terms of a machine-readable contract or agreement. Unlike a traditional contract which would be written in natural language, a smart contract is a machine executable program which comprises rules that can process inputs in order to produce results, which can then cause actions to be performed dependent upon those results.

Blockchains which provide an open, public ledger make available to any interested parties the ability to trace the movement of specific digital coins, digital assets, or control of digital resources across a sequence of addresses. While the ledger being open and distributed is useful in acting as a means to trust the system, the ability it gives for tracking transactions across addresses allows for digital assets related to specific historical transactions to be analysed and correlated. To address this issue, security and anonymization solutions have been developed. This can be useful as many real-world commercial transactions are confidential in nature, either for legal reasons, commercial reasons, or both. Accordingly, blockchain systems must be capable of ensuring both security and confidentiality for such commercial transactions despite the public nature of the blockchain.

Although the use of pseudonyms in the Bitcoin cryptocurrency protocol is often thought of as being an enabler of anonymous payments, the success of a variety of research in uncovering user identities has shown that anonymity within the Bitcoin network is not so easily achieved. Given that the demand for anonymity remains, the present disclosure proposes a variety of technical solutions based on implementing a plurality of or a combination of type of transactions for effecting one or more digital asset payments transfers off chain in a secure manner, thereby improving the levels of security as well as anonymity available for cryptocurrency protocols or protocols for transfer of digital assets between one or more computing resources, at both application and network layers.

SUMMARY

According to a first aspect of the disclosure as described herein there is provided a computer-implemented method for exchanging blockchain transactions between n>2 participants and subsequently broadcasting the blockchain transactions over a blockchain network for storage on a blockchain, the computer-implemented method comprising:
   generating and exchanging cryptographic keys and associated blockchain addresses between participants;
   modifying each of the blockchain transactions to be exchanged between participants by including a refund output in each blockchain transaction to be claimed by the participant in charge of broadcasting the transaction;
   constructing one or more deposit transactions using the cryptographic keys and the associated blockchain addresses and submitting the one or more deposit transactions to the blockchain, the one or more deposit transactions being constructed to refund a participant who correctly broadcasts another participants blockchain transaction and compensate a participant if their blockchain transaction is not correctly broadcast;

signing and exchanging the modified blockchain transactions between the participants;

constructing refund transactions using for inputs the outputs of the one or more deposit transactions and the refund outputs of the modified blockchain transactions;

constructing compensation transactions using for inputs the outputs of the one or more deposit transactions;

broadcasting the compensation transactions and the modified blockchain transactions; and broadcasting the refund transactions upon confirmation of the modified blockchain transactions on the blockchain, wherein if a participant's modified blockchain transaction is not confirmed on the blockchain the participant claims an associated unspent output in the compensation transaction.

Advantageously, the method of the first aspect presents a way for multiple blockchain users to exchange their transaction before diffusion over the blockchain network in order to blur the link between the IP address of the transaction generated by a user and the user's blockchain address in the transaction.

The method provides a technical solution to exchange transactions directly off-chain. Participants in the method agree to make deposits and alter their transaction in such a way that a refund and compensation scheme put in place automatically relies on the confirmations in the blockchain of the transactions exchanged among participants thus providing increased security as well as anonymity. The method scales for an arbitrary number (n>2) of participants.

The technical advantages are provided by defining the above-mentioned plurality of distinct types of transactions to be set up, i.e. deposit, refund, compensation, main transaction etc., and the manner in which they interact with each other. The present disclosure herein also discusses the structure for each of these types of transaction, and the key exchange mechanism between the participants. In some embodiments, a sequence of such types of transactions that provide intermediate results enables the off-chain exchange to take place accurately and securely, while preserving anonymity in relation to the IP or network end points associated with the participants. Furthermore, as discussed below, specific mechanism for computing one or more cryptographic keys for encrypted channels and/or signatures and/or blockchain addresses are proposed for ensuring these advantages. Accordingly, and advantageously the present disclosure, particularly the claimed aspects and embodiments, propose a secure, accurate and scalable technique for implementing one or more transactions that may be associated with digital assets, i.e. cryptocurrency or tokens, off-chain before it is provided to a distributed ledger.

The generating and exchanging of cryptographic keys and associated blockchain addresses between participants may comprise the following:

each participant $U_i$ generates two private-public key pairs $(k_i^1, P_i^1)$ and $(k_i^2, P_i^2)$;

the participants are randomised to realise an ordered set $\{U_0, U_1, \ldots, U_{n-2}, U_{n-1}\}$;

each participant $U_i$ exchanges the two public keys, $P_i^1$ and $P_i^2$, with two other participants;

each participant $U_i$ creates a pair of blockchain addresses $(\alpha_i, \beta_i)$ using their public keys, $P_i^1$ and $P_i^2$, and the ones provided by the two other participants; and each participant $U_i$ exchanges the pair of blockchain addresses $(\alpha_i, \beta_i)$ with the two other participants.

Furthermore, one of the blockchain addresses $(\alpha_i)$ created by each participant may require a signature from both the participant $(U_i)$ and another participant $(U_{i+1})$. Furthermore, one of the blockchain addresses $(\beta_i)$ created by each participant $(U_i)$ may require only a signature from another participant $(U_{i-1})$.

The aforementioned options provide an example of how suitable cryptographic keys and associated blockchain addresses can be generated and exchanged for subsequent use in the transaction exchange, refund and compensation scheme.

Each participant $U_i$ may also generate a private-public key pair $(y_i, Q_i)$ and publish the public key. This enables the participants to communicate with each other via an encrypted channel using the key pair $(y_i, Q_i)$ when implementing the transaction exchange, refund, and compensation scheme.

The one or more deposit transactions can be constructed such that outputs of the one or more deposit transactions are shuffled or randomized relative to inputs of the one or more deposit transactions. The participants make their deposit in a common deposit transaction or alternatively each participant can create an individual deposit transaction. The deposit transactions can be Pay To Script Hash (P2SH) deposit transactions. Furthermore, each deposit can be constructed such that it is sent to one of the blockchain addresses generated and exchanged by the participants or, after a time $\Delta T_E$, to a blockchain address of the participant who made the deposit if their blockchain transaction is not confirmed on the blockchain. Further still, the deposit transaction for the participants is constructed by one of the participants.

The aforementioned options provide an example of how one or more suitable deposit transactions can be generated to implement the transaction exchange, refund and compensation scheme.

Modifying each of the blockchain transactions to be exchanged can comprise locking the refund output under the public key provided by another participant and the modified transaction is signed and sent to the other participant. Each participant $U_i$ can construct their refund transaction $R_x^i$ using for inputs the output in the one or more deposit transactions (i.e. the output $O_i$ locked by participant $U_i$ in the deposit transaction) and the refund output sent to the public address $\beta_{i-1}$ in the blockchain transaction $T_x^{i-1}$ generated by participant $U_{i-1}$ such that participant $U_i$'s refund will inherently depend on them submitting participant $U_{i-1}$'s blockchain transaction $T_x^{i-1}$ for inclusion into the blockchain. The two inputs in the newly created transaction $R_x^i$ can thus require the signature of $U_i$ and $U_{i-1}$ as follows:

input x ($O_i$) requires the signature of participant $U_i$ and participant $U_{i-1}$; and input d ($\beta_{i-1}$) only requires the signature of $U_i$.

Following the above, participant $U_i$ can send their refund transaction $R_x^i$ to participant $U_{i-1}$ who signs it and sends it back to participant $U_i$ who also then signs the transaction $R_x^i$.

The aforementioned options provide an example of how suitable refund transactions can be generated to implement the transaction exchange, refund and compensation scheme.

Each participant $U_i$ can construct their compensation transactions $C_x^i$ using the output sent to $O_{i+1}$ in the one or more deposit transactions and participant $U_i$ sends the newly created transaction $C_x^i$ to participant $U_{i+1}$ who signs it and return it to participant $U_i$ where input x ($O_{i+1}$) in $C_x^i$ requires the signature of both $U_i$ and $U_{i+1}$. The compensation transactions can have outputs which are locked for a time $\Delta T_S$ that defines the maximum time allowed for the participants to broadcast the exchanged blockchain transactions and see these confirmed on the blockchain network.

The aforementioned options provides an example of how suitable compensation transactions can be generated to implement the transaction exchange, refund and compensation scheme.

Broadcasting the compensation transactions and the blockchain transactions can comprise each participant $U_i$ broadcast two transactions $C_s^i$ and $T_x^{i-1}$ in that order. This ensures the compensation transaction is in place prior to broadcast of the main blockchain transaction.

Broadcasting the refund transactions upon confirmation of the blockchain transactions on the blockchain can comprise each participant $U_i$ broadcasting refund transaction $R_x^i$ thereby claiming their deposit. Furthermore, a participant may only claim the unspent output in the compensation transaction when their blockchain transaction is not confirmed on the blockchain after a time $\Delta T_S$. This methodology is consistent with providing compensation transactions having outputs which are locked for a time $\Delta T_S$ that defines the maximum time allowed for the participants to broadcast the exchanged blockchain transactions and see these confirmed on the blockchain network.

Embodiments of the present disclosure can be provided in a variety of forms. For example, a computer readable storage medium can be provided which comprises computer-executable instructions which, when executed, configure one or more processors to perform the method as described herein. An electronic device can also be provided which comprises: an interface device; one or more processor(s) coupled to the interface device; and a memory coupled to the one or more processor(s), the memory having stored thereon computer executable instructions which, when executed, configure the one or more processor(s) to perform the method as described herein. A node of a blockchain network can also be provided, the node configured to perform the method as described herein.

BRIEF DESCRIPTION OF THE DRAWINGS

These and other aspects of the present disclosure will be apparent from and elucidated with reference to, the embodiments described herein. Embodiments of the present disclosure will now be described, by way of example only, with reference to the accompany drawings in which:

FIG. 13 is a schematic diagram illustrating a computing environment in which various embodiments can be implemented.

DETAILED DESCRIPTION

Figure 1:
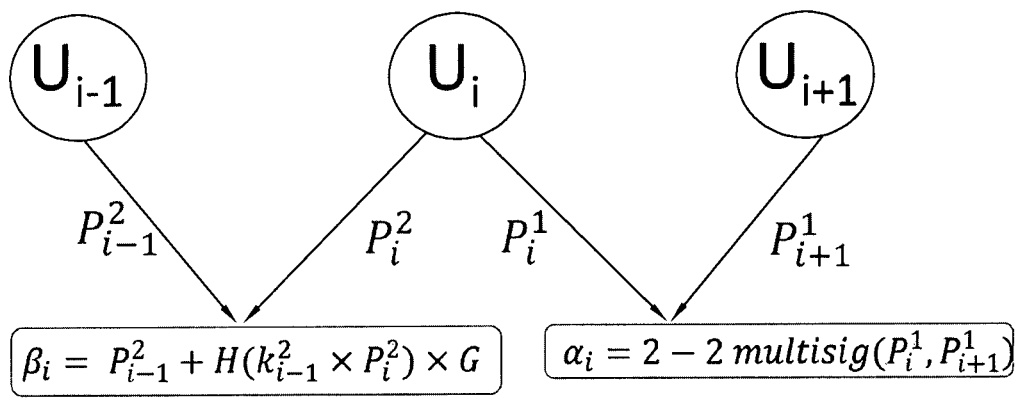
FIG. 1 shows a schema of two addresses/public keys generated by a participant $U_i$ using both his/her public keys and the public keys of his/her two closest neighbours.

As previously indicated in the background section, although the use of pseudonyms in the Bitcoin cryptocurrency protocol is often thought of as being an enabler of anonymous payments, the success of a variety of research in uncovering user identities has shown that anonymity within the Bitcoin Network is not so easily achieved. Given that the demand for anonymity remains, a variety of technical solutions have been developed that improve on the levels of anonymity available for cryptocurrency protocols at both application and network layers.

This specification presents an extension of a Direct Transaction Exchange (DTE) protocol to n>2 participants. A DTE protocol offers a solution to exchange transactions directly off-chain before submission of the transactions and their diffusion in the Bitcoin network. Participants in the DTE protocol agree to deposit some coins and alter their main transaction in such a way that the refund and compensation scheme put in place relies on the confirmations in the blockchain of the transactions exchanged among participants. In the present specification it is described how to scale a DTE protocol to an arbitrary number (n>2) of participants.

The Internet Protocol (IP) address(es) associated with a cryptocurrency user may be used to compromise Bitcoin network anonymity. Indeed, a malicious adversary may link a public key to an IP address and track all transactions submitted by a user. Moreover, IP information may be used to retrieve the real user's identity by combining this information with other sources, e.g. internet forums and social media. In such circumstances, generating multiple public-private key pairs for different sets of transactions or participating in mixing services as expedients to increase the anonymity of the operations may not be successful [1].

De-anonymization attacks are typically carried out using a "super node", which connects to active Bitcoin nodes and monitors the transactions transmitted. Symmetric diffusion over the network allows for a 30% success rate in IP-public key linking [2]. The algorithms used mainly exploit peer-to-peer (P2P) graph structure and information about the diffusion.

By tracking the Bitcoins' or other cryptocurrencies' flow, monitoring the public ledger one may link multiple addresses generated by the same user. This result can be achieved by analysing the transaction graph and clustering together addresses.

Anonymous relay tools such as Tor [3] offer identity protection, but still exhibit weaknesses and possible downsides. Indeed, relay systems may be vulnerable to traffic analysis, whereby the user's "first-hop" link to Tor and the "last-hop" link from Tor to the user's communication partner may be traced and used to correlate packets. Moreover, attack may cause denial of service as well as put the users' anonymity at risk.

Biryukov et al. [2] present a method to de-anonymise P2P networks, by linking the users' pseudonyms with their IP addresses. This solution relies on the set of nodes a client connects to, which uniquely determine the client identity and the origin of the transaction.

In this specification we propose a protocol to enforce the users' anonymity at the network layer by allowing Bitcoin users to exchange their transactions before their diffusion on the network, thus blurring the link between the IP address of the transaction generated by a user and the user's Bitcoin address in the transaction. As detailed in this specification, the n-DTE protocol relies on a deposit of coins made by the participants, and the alteration of their main transaction in such a way that the refund and compensation scheme put in place relies on the confirmation in the blockchain of the transactions exchanged among participants.

In its simplest form [4], we considered two participants in the DTE protocol. Both participants generate a Main Transaction that they wish to exchange before submission for inclusion in the Bitcoin blockchain. In order to do so and ensure that both participants fulfil their roles and are protected in case the protocol is interrupted before completion, the participants must commit funds in a deposit transaction and alter their original transaction so that their refund is conditioned by the confirmation of the exchanged transactions on the network.

We propose to scale that protocol to n>2 participants. The different steps in the n-DTE protocol are detailed herein. We first describe key generation and exchange between participants. We then construct a Deposit Transaction using the keys and addresses newly generated. We describe the alteration of the Main Transactions being exchanged between the participants. We then construct Refund and Compensation schemes of the protocol. Finally, we describe the transactions exchange between, and broadcast by, the participants.

Key Generation and Exchange

Given a set of n individuals $\{U_i | i \in [0, n-1]\}$ participating in the n-DTE protocol to exchange their Main Transaction, the participants create and exchange public keys in the following way:

Each participant $U_i$ generates two private-public key pairs: $(k_i^1, P_i^1)$ and $(k_i^2, P_i^2)$.

Each participant $U_i$ generates one extra (ephemeral) private-public key pair: $(y_i, Q_i)$ and publishes the public key.

The participants are randomised to realise an ordered set $\{U_0, U_1, \ldots, U_{n-2}, U_{n-1}\}$.

The participants can communicate with their neighbours via encrypted channel using the ephemeral key pair made public $(y_i, Q_i)$.

Each participant $U_i$ exchanges the two public keys, $P_i^1$ and $P_i^2$, with their two closest neighbours. As an example $U_0$ exchanges $P_0^1$ and $P_0^2$ with $U_1$ and $U_{n-1}$ while $U_1$ exchanges $P_1^1$ and $P_1^2$ with $U_0$ and $U_2$.

Each participant $U_i$ creates a pair of Bitcoin addresses using their public keys and the ones provided by her neighbours [here we show the Bitcoin public keys generated by a participant; the Bitcoin address A associated to a public key P is given by A=RIPEMD160(SHA256(P))]:

Multisignature address shared with $U_{i+1}$: $\alpha_i$=2-2multisig $(P_i^1, P_{i+1}^1)$ Diffie-Hellman secret shared with $U_{i-1}$: $\beta_i = P_i^2 + c_{i-1,i} \times G$ where $c_{i-1,i} = H(k_i^2 \times P_{i-1}^2) = H(k_{i-1}^2 \times P_i^2)$ is the secret shared between the two participants. H( ) is a collision-resistant hash function.

As an example, $U_0$ creates the following two addresses:
$\alpha_0$=2-2multisig$(P_0^1, P_1^1)$ and
$\beta_0 = P_0^2 + c_{n-1,0} \times G$ with $c_{n-1,0} = H(k_0^2 \times P_{n-1}^2) = H(k_{n-1}^2 \times P_0^2)$ The addresses generation is illustrated in FIG. 1.

The funds sent to the address derived from $\alpha_i$ will require a signature from both $U_i$ and $U_{i+1}$ using their first private keys, respectively $k_i^1$ and $k_{i+1}^1$.

The funds sent to the address derived from $\beta_i$ will require a signature from $U_{i-1}$ using the private key associated to the new public key, given by: $k_{i-1}^2 + H(k_{i-1}^2 \times P_i^2)$. Although it is easy for the participant $U_i$ to create and share the public key with $U_{i-1}$, only the latter can deduce the private key and therefore sign a transaction's UTXO sent to the address derived from $\beta_i$.

Figure 2:
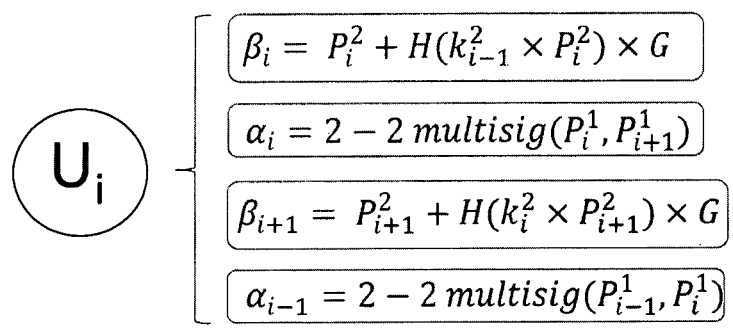
FIG. 2 shows a set of public keys known by the participant $U_i$.

The participants can then exchange their newly created public keys/addresses and verify their validity knowing the public keys used to construct these. In summary, the participant $U_i$ creates 2 addresses and knows of 2 addresses shared with his left-hand neighbour $U_{i-1}$, and 2 addresses shared with his right-hand neighbour $U_{i+1}$ as illustrated in FIG. 2.

Note that the participant $U_i$ does not know the private key associated to the public key $\beta_i$ he or she created. On the other hand, only $U_i$ knows the private key associated to the public key $\beta_{i+1}$ created by his right-hand neighbour $U_{i+1}$.

Deposit Transaction

Recall that the goal of this protocol is for the n participants to exchange their transaction before broadcast on the blockchain. We will denote Main Transactions as these transactions being exchanged in the following.

In order to incentivise the participants to complete the n-DTE protocol and to protect honest participants from malicious ones, we propose that each participant deposit an arbitrary amount of Bitcoin whose refund is conditioned on the successful completion of the required tasks by the participant.

Such deposit can be made in various ways. For instance, the participants can all make their deposit in a common Bitcoin transaction, or each participant can create his/her individual deposit transaction (although this would imply more fees paid to the miners overall). In the following, we consider a common transaction to collect the participants' deposit. This choice implies the use of a shuffling technique to blur the link between the inputs and the outputs in the said transaction.

The n participants creates a n-input/n-output P2SH Deposit Transaction, denoted $D_x$ in the following, where they all commit an amount of x Bitcoin agreed beforehand. The UTXOs from $D_x$ will be used later in the protocol to create two sets of transactions:

One set of Refund Transactions for the refund of the deposit made in $D_x$ when a participant correctly broadcasts another participant Main Transaction on the network.

One set of Compensation Transactions for compensating a participant in case his/her Main Transaction is not broadcast after a certain amount of time.

Participant $U_i$ constructs the script $L_i$ locking his/her deposit in $D_x$. This script will offer two options to spend the associated output amount x Bitcoin:

It will either send $U_i$'s x Bitcoin to the address that can be redeemed by both $U_{i-1}$ and $U_i$ signing with their private keys, $k_{i-1}^1$ and $k_i^1$ respectively ($\alpha_{i-1}$ in FIG. 2).

Or after a certain point in time $\Delta T_E$ following the inclusion of $D_x$ in the blockchain, to an address owned by $U_i$. Note that $U_i$ may use a new (ephemeral) public key (denoted $P_i^3$ in the following) to generate the latter address. The locking time value must be chosen so that the funds can be redeemed by $U_i$ at some point in the future if the protocol finishes without the successful inclusion of his/her Main Transaction in the Bitcoin blockchain. The locking time parameter is defined using the opcode OP_CHECKSEQUENCEVERIFY. This new opcode for the Bitcoin scripting system (OP_CHECKSEQUENCEVERIFY) was introduced in BIP112; it allows execution pathways of a script to be restricted based on the age of the output being spent (https://github.com/bitcoin/bips/blob/master/bip-0112.mediawiki).

Figures 3, 4:
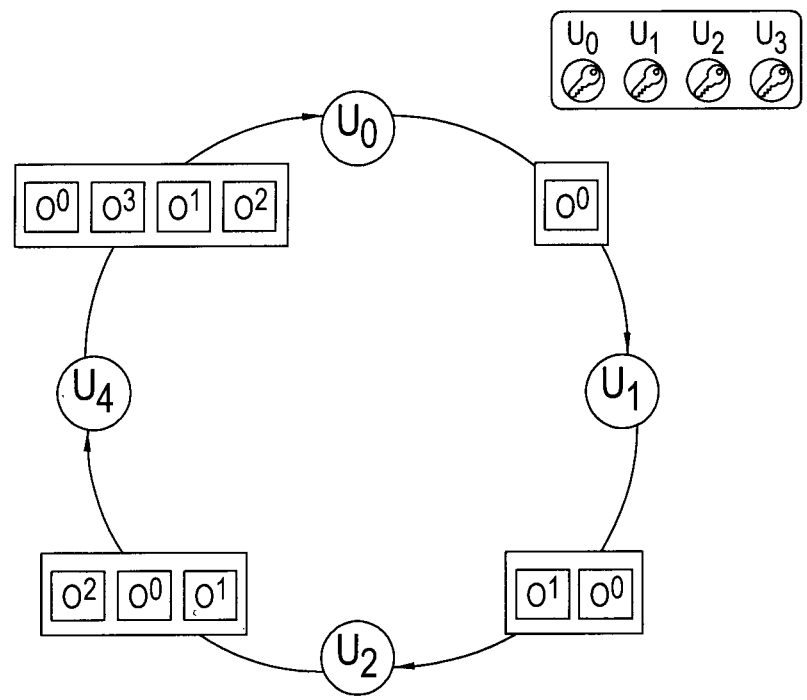
FIG. 3 shows an example of locking script made by the participant $U_i$ to lock their deposit in a deposit transaction $D_x$.
FIG. 4 shows a shuffling process for outputs in a deposit transaction.

We will denote $O_i$ the output (parameter set) generated by the participant $U_i$: $O_i$:{$L_i$, x}. An example of the locking script for the deposit of x Bitcoin made by $U_i$ is shown in FIG. 3.

One participant is responsible for gathering all the outputs and crafting the Deposit Transaction $D_x$. In the following we will designate $U_0$ as the participant collecting the set of outputs and the first participant to add his/her input and sign it in $D_x$. To protect the participants in the n-DTE protocol from external attack, the set of outputs is encrypted using the participants' public key $Q_i$ before being transferred from one participant to another. To blur the link between inputs and outputs in $D_x$, we consider that each participant will shuffle the set of outputs before passing on to his/her right-hand neighbour. This way the inputs order will not match that of the outputs in $D_x$. Alternatively, we could randomise the order of participants during the signing phase.

The outputs shuffling process, based on the CircleShuffle protocol [WP0388], begins when the first participant, $U_0$, encrypts his/her output $O_0$ with the next participant public key $Q_1$. The encrypted output address then comprises the 'set of shuffled outputs' (SSO). $U_0$ passes the SSO to $U_1$. $U_1$ decrypts the SSO, using her private key $y_1$ adds her output, shuffles the outputs and encrypts the SSO using $Q_2$, and forwards it to $U_2$. This process, illustrated for 4 participants in FIG. 4 (n=3), continues until it reaches $U_{n-1}$, where n is the number of participants.

After $U_{n-1}$'s output address is added to the SSO, $U_{n-1}$ performs a final shuffle, encrypts the SSO with $Q_0$, and sends the SSO back to the first user, $U_0$. This permutation of the output addresses in the SSO represents the final order in which the outputs are included in the Deposit Transaction $D_x$.

$U_0$ decrypts the SSO, using her private key $y_0$ and creates the Deposit Transaction $D_x$. $U_0$ adds his/her input, signs the transaction and forwards $D_x$ to the next participant. Each participant on seeing the inclusion of his/her chosen output in the transaction, adds and signs his/her input with a SIGHASH_ANYONECANPAY flag. After all participants have signed $D_x$, the transaction is submitted by the last participant for inclusion into the blockchain.

FIG. 4 shows an illustration of the $D_x$ transaction for 4 participants:

{$U_0$, $U_1$, $U_2$, $U_3$}={Alice, Bob, Carol, Dave}

We change the indices i={0,1,2,3} into i={A, B, C, D} when referring to our illustration with 4 participants.

Figure 5:
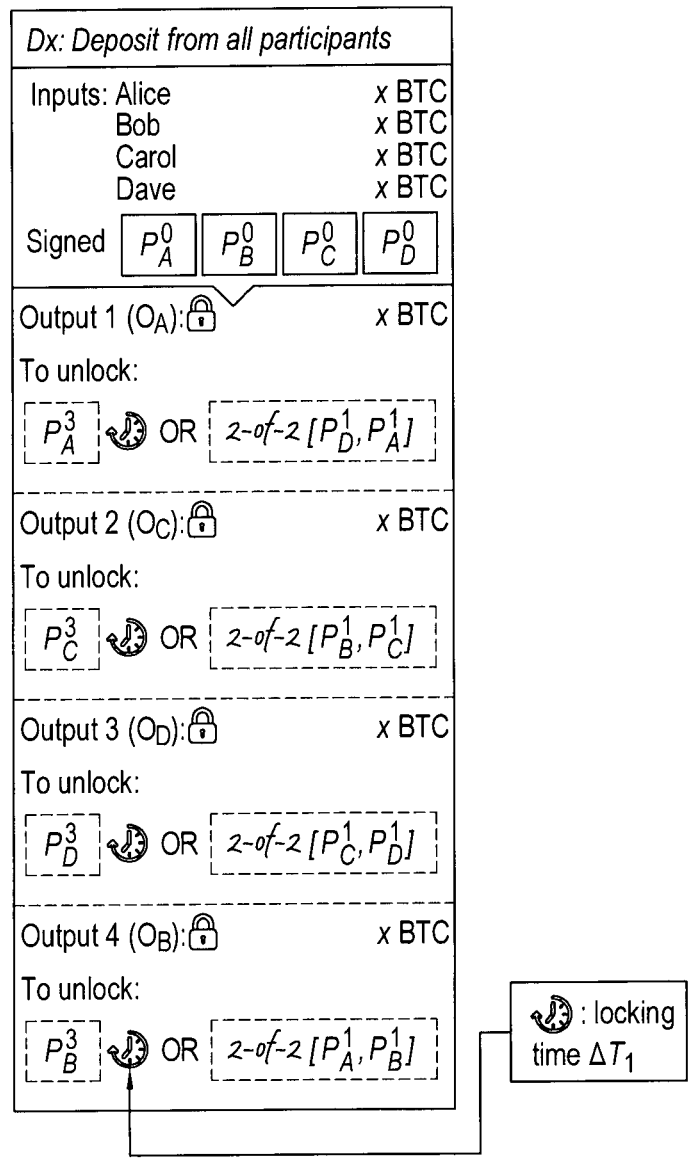
FIG. 5 shows a deposit transaction where four participants deposit an amount x of Bitcoin before a main transactions exchange.

Each participant signs the transaction $D_x$, effectively spending x Bitcoin from an address derived from the participant public key. Note that the public keys are denoted $P_i^0$, i={A, B, C, D} in FIG. 5, instead of $P_i^0$, i=0, ..., 3.

Each x Bitcoin is sent to a new address (note that the outputs are shuffled and therefore the order of inputs and outputs that can be unlocked with two participants signature or after a certain point in time by one participant signature. We also change the indices i={0,1,2,3} into i={A, B, C, D} in the locking scripts depicted in FIG. 3.

We will denote $O_A$/$O_B$/$O_C$/$O_D$ the output locked in $D_x$ and spent by Alice/Bob/Carol/Dave.

Upon seeing the Deposit Transaction $D_x$ confirmed on the blockchain, the participants can now enter the next phase of the protocol that is the exchange their Main Transaction as detailed below. If they have not completed the exchange and broadcast of the Main Transactions before $\Delta T_E$ they will collect their deposit of x Bitcoin in $D_x$ and the protocol will finish.

Main Transactions Exchange

The n-DTE protocol relies on a Refund and Compensation mechanism destined to incentivise the participants to complete the Main Transactions exchange and broadcast on the Bitcoin Network. Such mechanism can be achieved by constraining the refund of the coins locked in the Deposit Transaction committed by the participants in such way that the refund for a participant is only available after he or she broadcasts the Main Transaction issued by another participant. To do so, we propose to alter a Main Transaction by adding an extra output used in the Refund Transaction of the participant in charge of broadcasting the said Main Transaction.

Although we do not wish to restrict the format/structure of the participants' Main Transaction (number of inputs/outputs aside the dust, amount transfer, locking script), we argue that the transactions should have similar size for uniformity purposes. The amount spent by a participant should remain arbitrary although bigger than the fees for miners involved in this protocol. In the following, we assume for simplicity that each participant wishes to transfer an arbitrary amount of Bitcoin from one address to another using Pay-to-Public-Key scripts. In our illustration in FIG. 6, we for example assume that Alice (Dave) wishes to transfer m Bitcoin (p Bitcoin) from an address derived from a public key $S_A$ ($S_D$) to another address derived from another public key $R_A$ ($R_D$). Note that Alice may not necessarily be the recipient of the m Bitcoin.

The participants agree on a dust amount d of Bitcoin—a few satoshis—and add an extra output to their Main Transaction. Generally, we will denote $T_x^i$ the Main Transaction generated by the participant $U_i$ for i={0,1,2,3} or i={A, B, C, D} in our illustration with 4 participants.

As an example, the first participant $U_0$ (or Alice in the illustration) alters her Main Transaction $T_x^0$ (or $T_x^A$), by adding a second output with d as the output amount and locked under a Pay-To-Public-Key script using the public key created earlier by $U_1$ (or Bob): $\beta_1 = P_1^2 + c_{0,1} \times G$ (or $\beta_B = P_B^2 + c_{A,B} \times G$). Alice signs her transaction $T_x^A$ and forwards it to Bob. Generally, the participant $U_i$ signs his/her transaction $T_x^i$ and sends it to her neighbour $U_{i+1}$.

Figure 6:
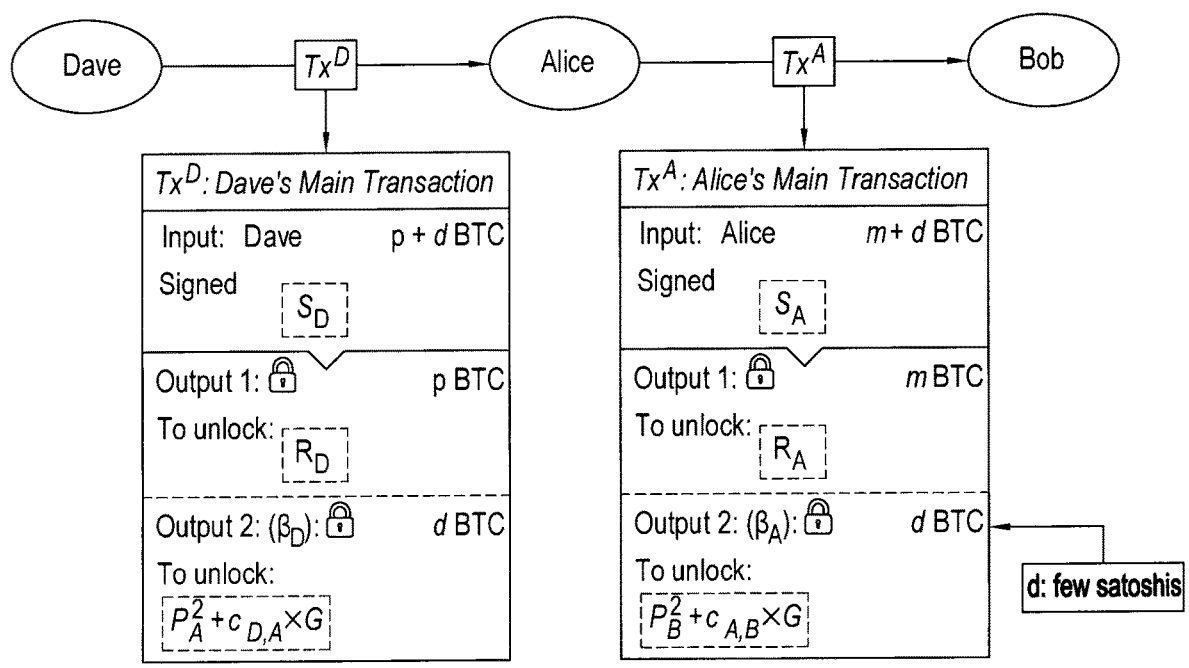
FIG. 6 shows two main transactions exchanged in a direct transaction exchange (DTE) protocol.

This process continues until each participant has received the transaction of their closest neighbour to the left. FIG. 6 illustrates the alteration and exchange of the two transactions, $T_x^D$ and $T_x^A$, between the last (Dave), the first (Alice) and the second (Bob) participants.

At this point the participants do not broadcast the received Main Transaction on the network. They first prepare the refund and compensation scheme:

The refund scheme will ensure the refund a participant $U_i$ after he/she broadcasts the transaction $T_x^{i-1}$ of his/her left-hand neighbour $U_{i-1}$.

The compensation scheme will compensate a participant $U_i$ in case the protocol wasn't completed and her transaction $T_x^i$ was not broadcast by her right-hand neighbour $U_{i+1}$ and confirmed to be included in the blockchain in due time.

Refund Transaction

The participant $U_i$ is now in possession of the Main Transaction $T_x^{i-1}$ generated by his/her left-hand neighbour $U_{i-1}$. As illustrated in FIG. 6, Alice is for instance in possession of Dave's Main Transaction $T_x^D$.

The participant $U_i$ creates his/her Refund Transaction, namely $R_x^i$, using for inputs the UTXO sent to $O_i$ in the Deposit Transaction $D_x$ and the dust sent to $\beta_{i-1}$ in the Main Transaction $T_x^{i-1}$ generated by $U_{i-1}$. This way, $U_i$'s refund will inherently depend on him/her submitting $U_{i-1}$'s Main Transaction $T_x^{i-1}$ for inclusion into the blockchain. $U_i$ sends his/her newly created Refund Transaction $R_x^i$ to $U_{i-1}$ who partially signs it (using $k_{i-1}^1$) and return it to $U_i$. Note that the two inputs in this newly created transaction $R_x^i$ require the signature of $U_i$ and $U_{i-1}$ as follows:

Input x ($O_i$): requires the signature of $U_i$ and $U_{i-1}$ using their first private keys, respectively $k_i^1$ and $k_{i-1}^1$.

Input d ($\beta_{i-1}$): only requires the signature of $U_i$ using the private key associated to the public key obtained using Diffie-Hellman secret share scheme: $k_i^2 + c_{i-1,i}$ where $c_{i-1,i} = H(k_i^2 \times P_{i-1}^2) = H(k_{i-1}^2 \times P_i^2)$.

Figure 7:
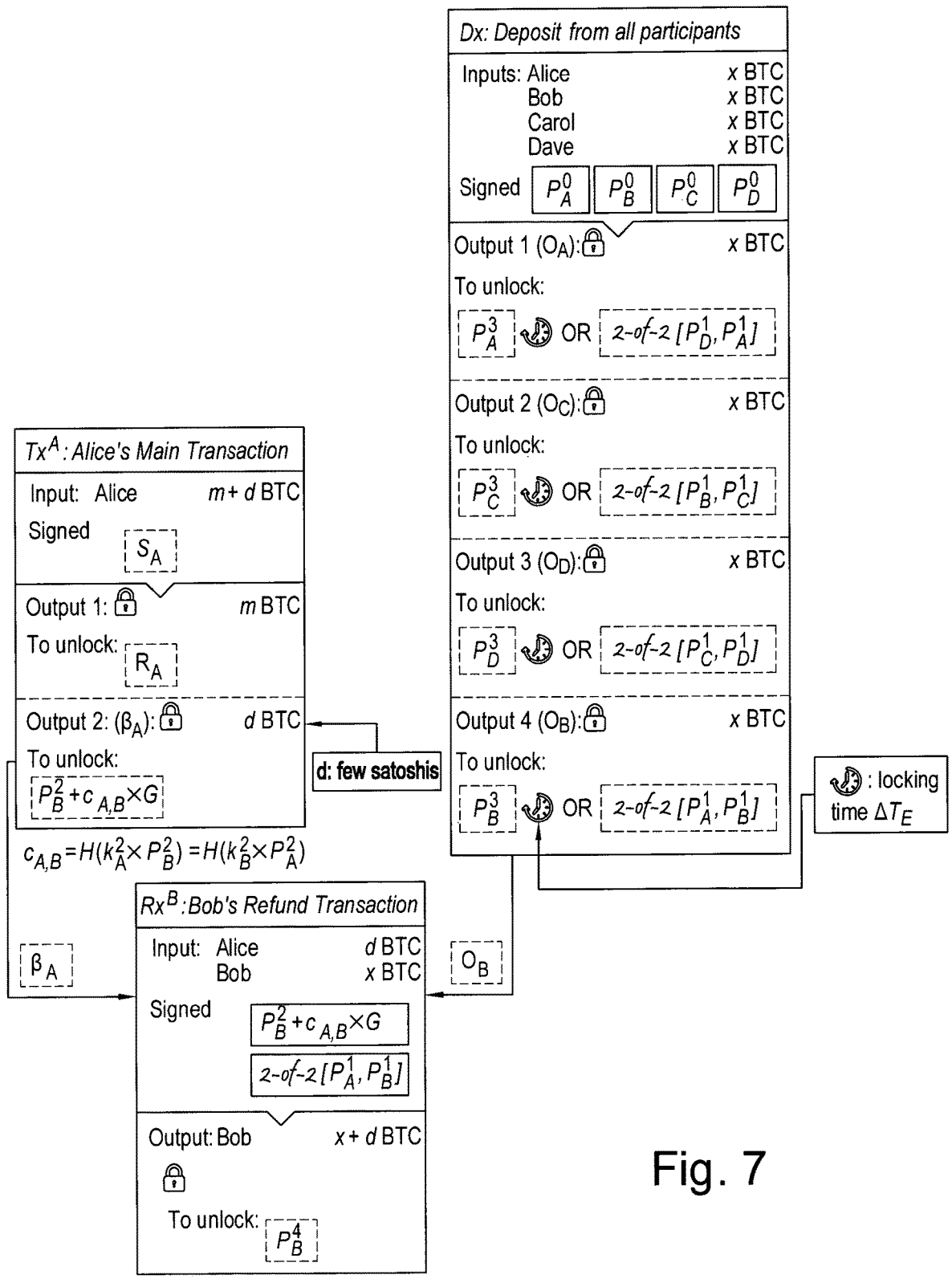
FIG. 7 shows a schema for construction of a refund transaction using a deposit transaction and a main transaction output.
Figure 8:
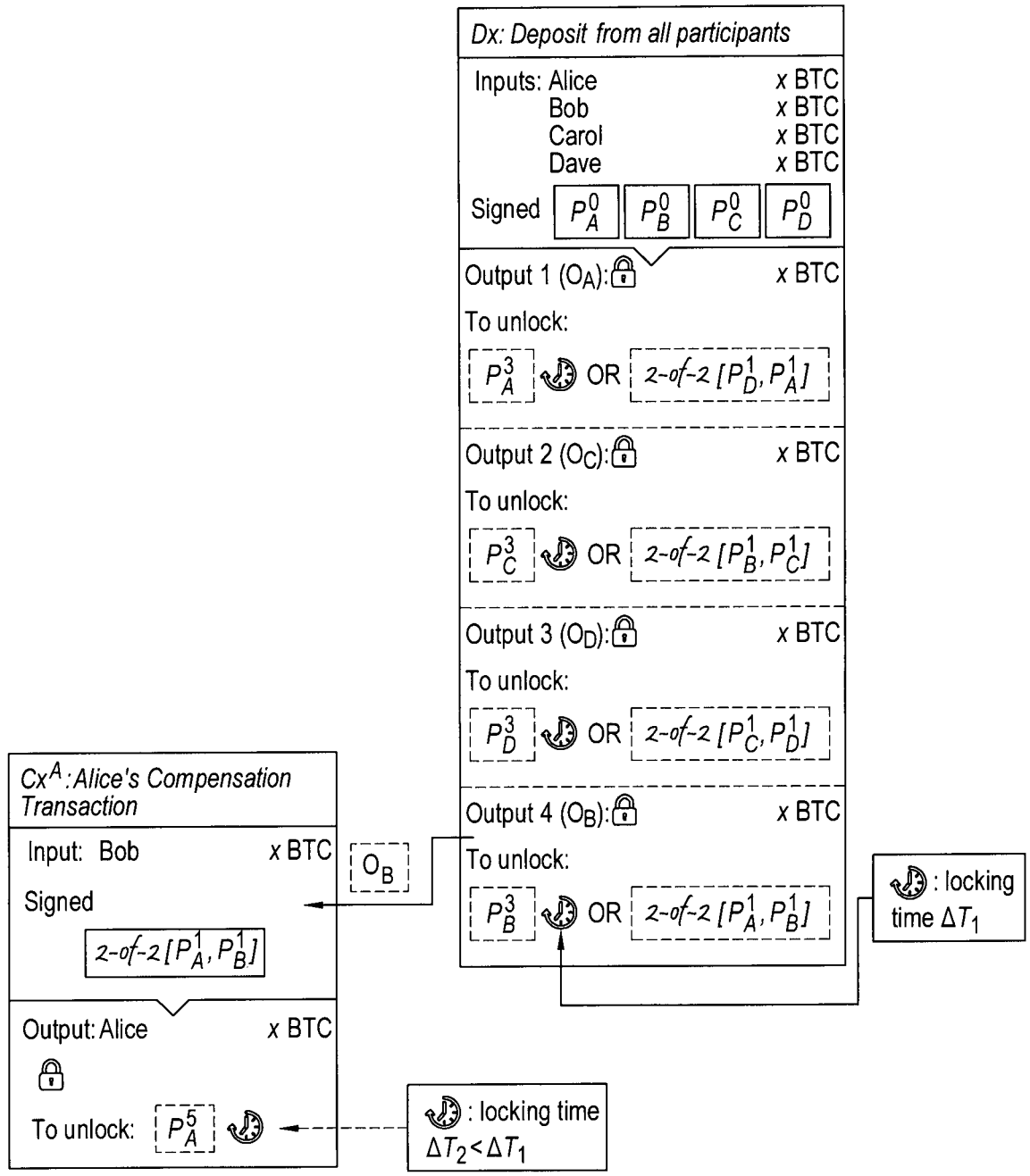
FIG. 8 shows a schema for construction of a compensation transaction using funds sent in a deposit transaction.

FIG. 7 illustrates the construction of the Refund Transaction $R_x^B$ created by Bob, using the Deposit Transaction $D_x$ output $O_B$ and Alice's Main Transaction $T_x^A$ output $\beta_A$. Bob sends his Refund Transaction $R_x^B$ to Alice who signs it and sends it back to Bob. At this point, Bob signs the transaction $R_x^B$ but does not broadcast it. If he did, the transaction would be rejected since the Bitcoins sent to $\beta_A$ are not available at this point in time. These will be spendable when the transaction $T_x^A$ is broadcast and confirmed on the blockchain.

Compensation Transaction

A Compensation Transaction is created to account for the case where one participant does not broadcast another participant's Main Transaction. In our example, if Bob does not broadcast Alice's Main Transaction $T_x^A$, Alice should be compensated for Bob's misconduct. Alice therefore creates a Compensation Transaction $C_x^A$ that takes as input the x Bitcoin spent by Bob ($O_B$) in the Deposit Transaction $D_x$. The output in the transaction $C_x^A$ contains a LockTime value $\Delta T_S$ agreed upon by all the participants in the n-DTE protocol, that should reflex the maximum time allowed for the participants in the protocol to broadcast the Main Transactions and see these confirmed on the network. Alice sends $C_x^A$ to Bob who verifies it, signs it and sends it back to Alice.

Generally, a participant $U_i$ creates his/her own Compensation Transaction using the UTXO sent to $O_{i+1}$ in the Deposit Transaction $D_x$. $U_i$ sends the newly created transaction $C_x^i$ to $U_{i+1}$ who signs it and return it to $U_i$. Note that the input x ($O_{i+1}$) in $C_x^i$ requires the signature of both $U_i$ and $U_{i+1}$ using their first private keys, respectively $k_i^1$ and $k_{i+1}^1$.

Summary

Figure 9:
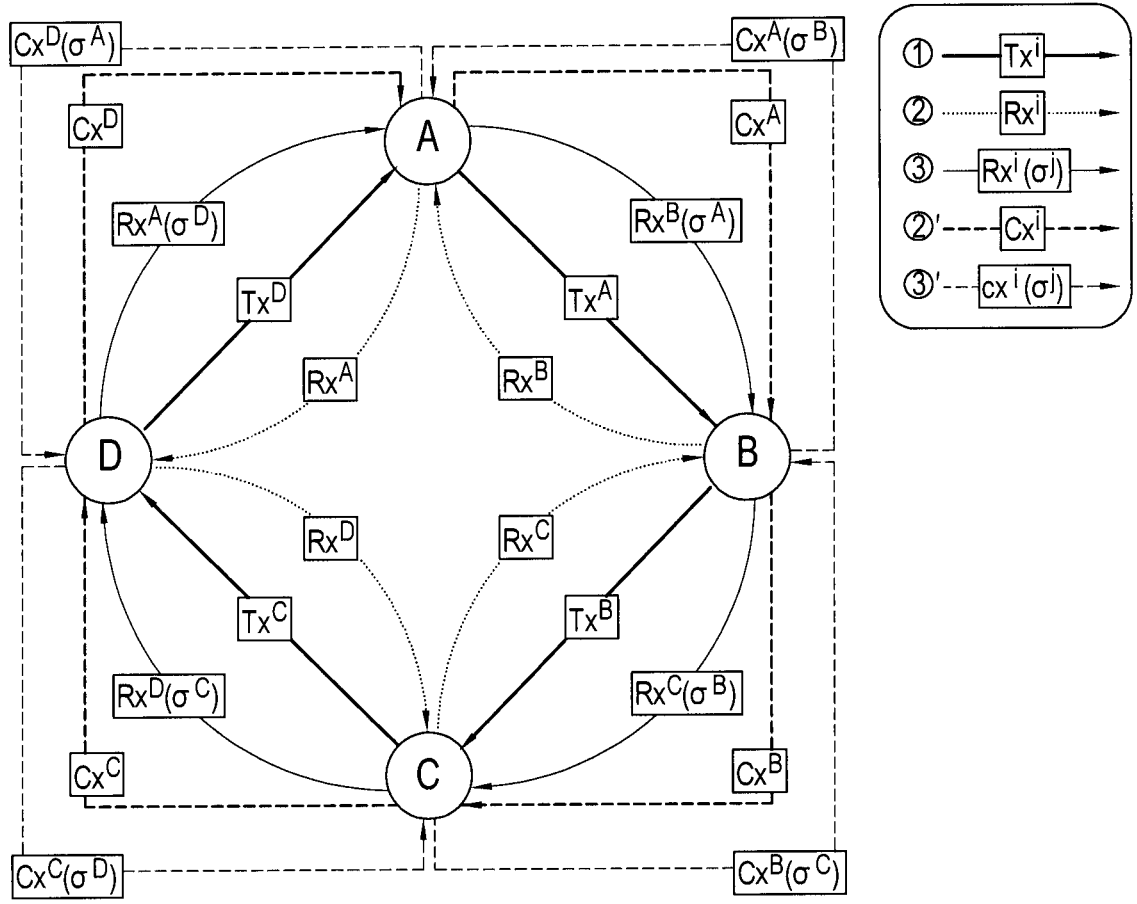
FIG. 9 shows an exchange of the transactions among the participants in an n-DTE protocol.

FIG. 9 summarises the exchange of the Main, Refund and Compensation Transactions among participants when n=4.

First, the Main Transactions are exchanged, sent by their author to their right-hand nearest neighbour.

Secondly the participants create their Refund Transactions and send these for signature to the left-hand nearest neighbour, whose public key was used to create the multi-signature address associated to the UTXO in the Deposit Transaction. Simultaneously the Compensation Transactions are created and sent for signature to the right-hand nearest neighbour, whose public key was used to create the multi-signature address associated to the UTXO in the Deposit Transaction After signing the Refund and Compensation Transactions, the left and right-hand neighbours respectively send these back to the Main Transaction's author.

Figure 10:
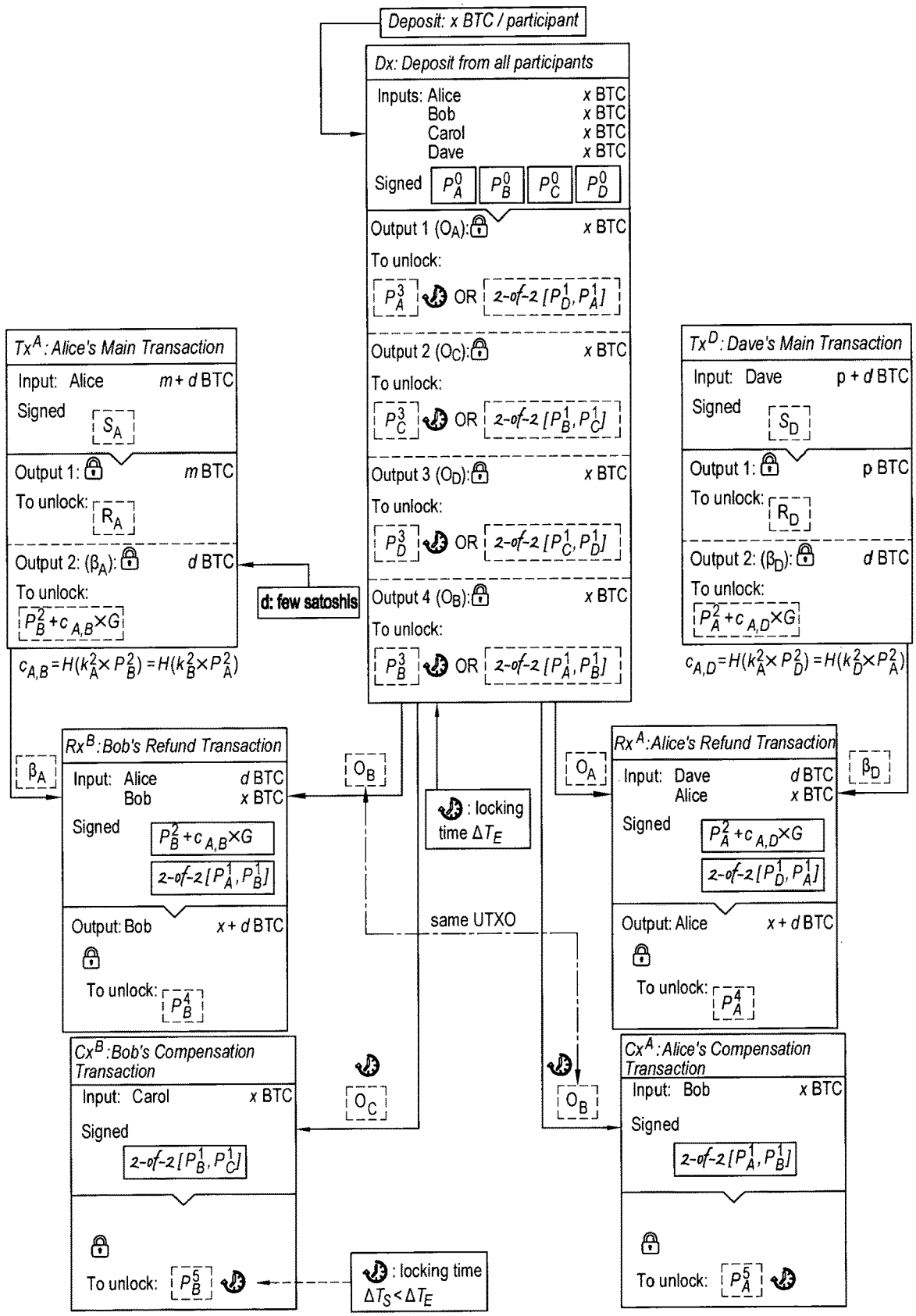
FIG. 10 shows transactions created for an n-DTE protocol (n=4)

FIG. 10 presents an illustration of the aforementioned transactions in the n-DTE protocol, their structure and internal dependency. Note that not all the transactions created for this protocol are shown in FIG. 10. Only the Main Transaction of the first (Alice) and last (Dave) participants are shown, as well as the Refund and Compensation Transactions for the first two participants, Alice and Bob.

Transactions Broadcast

With the refund and compensation scheme in place, each participant $U_i$ can now broadcast the following two transactions on the network: $C_x^i$ and $T_x^{i-1}$, in that order. Upon confirmation of $T_x^{i-1}$ on the blockchain the participant $U_i$ broadcasts $R_x^i$, effectively claiming his/her deposit. If $U_i$ does not see his/her Main Transaction $T_x^i$ confirmed on the network after an elapsed time $\Delta T_S$ he/she can spend the UTXO in the Compensation Transaction $C_x^i$, effectively claiming the deposit made by $U_{i+1}$. On the other hand if $U_i$ sees his/her Main Transaction confirmed in the blockchain before $\Delta T_S$, $U_{i+1}$ would have rightfully broadcast $R_x^{i+1}$, thus invalidating $C_x^i$, since the UTXO $O_{i+1}$ included in both $C_x^i$ and $R_x^{i+1}$ would already have been spent.

Figure 11:
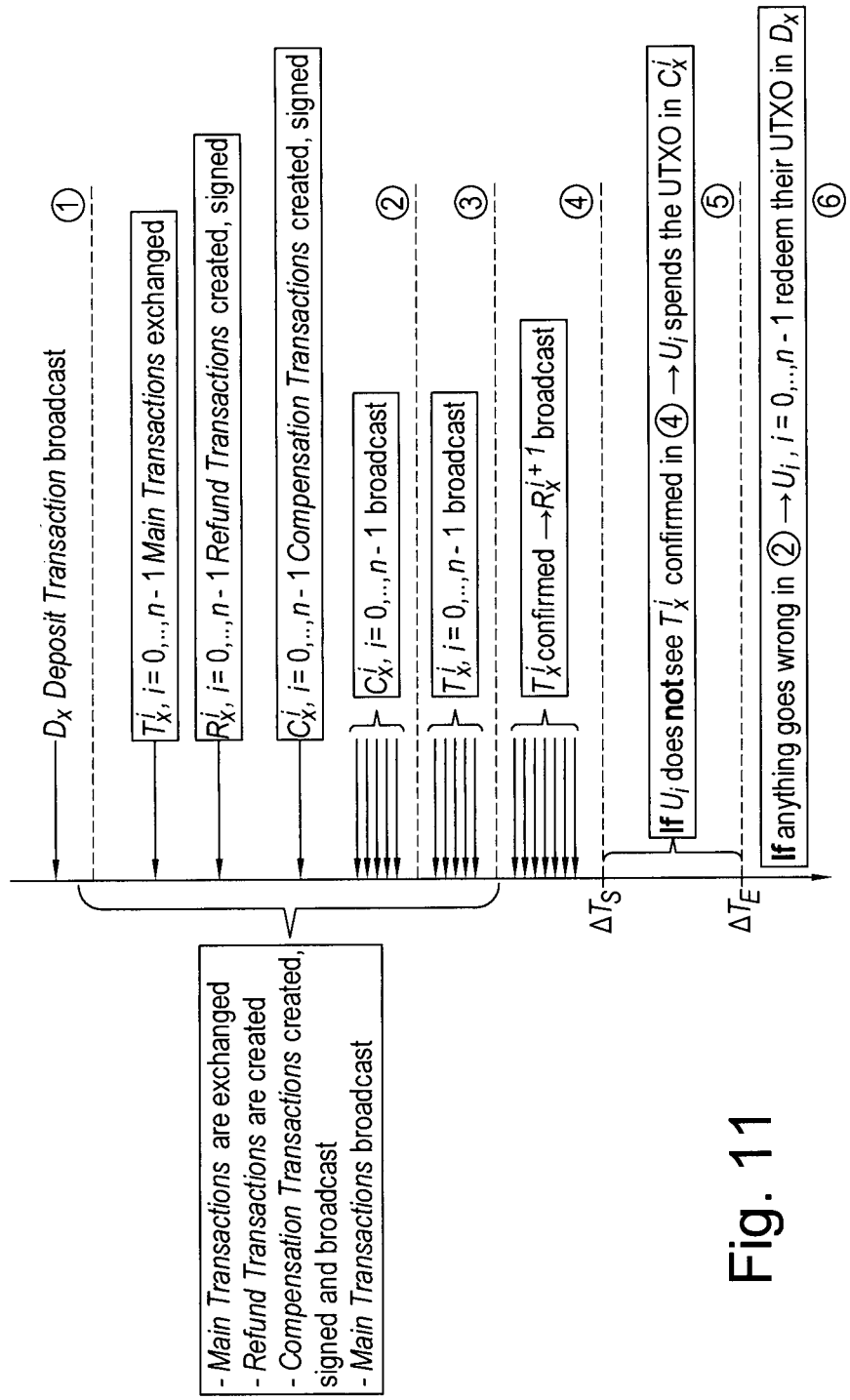
FIG. 11 shows a timeline for an n-DTE protocol.

FIG. 11 summarises the timeline of the n-DTE protocol:

Phase 1 ends with the broadcast of the Deposit Transaction $D_x$ on the Bitcoin network.

Phase 2 comprises of the Main Transactions exchange between the participants, the creation of the Refund and the Compensation Transactions and the submission of the latter for inclusion in the Bitcoin blockchain.

Phase 3 corresponds to the period allocated to each participant for broadcasting the Main Transaction of their left-hand neighbour.

Phase 4 represents the period of time before $\Delta T_S$ during which, if the participant $U_i$ sees $T_x^{i-1}$ confirmed on the blockchain he/she broadcasts his/her Refund Transaction $R_x^i$.

Phase 5 corresponds to the period between $\Delta T_S$ and $\Delta T_E$, during which the participants can spend the UTXO in their Compensation Transaction, if they don't see their Main Transaction confirmed on the Bitcoin blockchain.

Phase 6 corresponds to the period after $\Delta T_E$, after which, if anything went wrong in phase 2, the n-DTE protocol would have ended and the participants can rightfully collect their deposit back.

Figure 12:
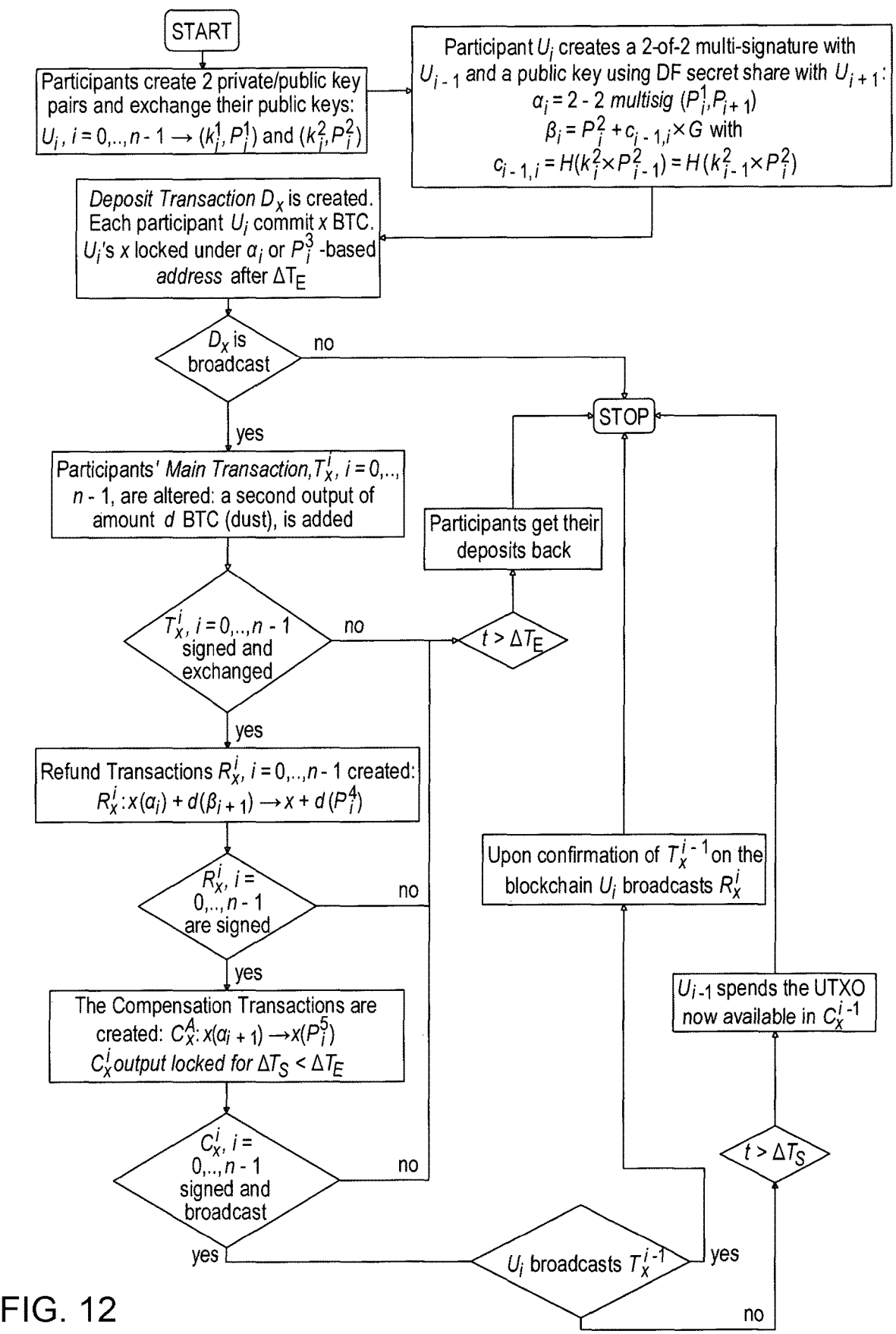
FIG. 12 shows a general overview of an n-DTE protocol.

FIG. 12 shows a general overview of the n-DTE protocol as described herein.

Information Exchange

The n-DTE protocol relies on a secure way to exchange public information between n participants. The participants in the protocol exchange their public keys and create 2-of-2 multi-signature addresses and new public keys using the Diffie-Hellman secret share scheme. They also exchange their Main Transactions for broadcast, as well as the other transactions (Refund and Compensation Transactions) generated in the protocol for signature.

Although not explicitly mentioned we recommend using each public key only once when generating (public key-based and multi-signature) addresses used in the transactions built in the n-DTE protocol, in order to blur the link between the different transactions generated in the protocol.

Additionally, we advocate for encrypting each message (public keys, transactions, addresses) sent between the participants using the public key of the message receiver.

Each participant $U_i$ will send up to three transactions on the network:

$T_x^{i-1}$: the Main Transaction generated by $U_{i-1}$ $C_x^i$: the Compensation Transaction for $U_i$ in the case $U_{i+1}$ does not broadcast $T_x^i$ within the allocated time.

$R_x^i$: the Refund Transaction for $U_i$ which is submitted after confirmation of $T_x^{i-1}$ on the blockchain.

Although an attacker might succeed in linking the addresses used in these transactions with the IP address of the user $U_i$, the desired effect to blur the link between the user's address of the transaction's author and the user's IP address is achieved as the Main Transaction is not sent to the network by its original author. An external attacker could gain enough knowledge to reconstruct the links between the transactions and their original author if the order of outputs in the deposit transaction $D_x$ revealed the order of participants in the protocol. Mainly for that reason, we describe a method to shuffle the outputs in $D_x$ to blur the link between the inputs and outputs in $D_x$. Alternatively, as we mentioned previously, the deposit made by the participant could be done in individual deposit transactions.

Conclusion

This specification presents an n-Direct transaction Exchange protocol (n-DTE) which offers a solution to exchange transactions directly off-chain before submission of the transactions and their diffusion in the network. This aims at blurring the link between the IP address of the transaction generated by a user and the user's bitcoin address in the transaction, therefore enforcing the anonymity of the user on the network.

The transactions exchange is achieved by adding a dust amount of Bitcoin into the Main Transactions output and constructing Refund Transactions that include this dust as well as a deposit made by the participants. This allows the participants to claim their deposit after they broadcast another participant's Main Transaction.

A Compensation scheme is also put in place to compensate a participant whose Main Transaction would not have been submitted for inclusion into the blockchain during the allocated time in this protocol.

System Overview

Turning now to FIG. 13, there is provided an illustrative, simplified block diagram of a computing device 2600 that may be used to practice at least one embodiment of the present disclosure. In various embodiments, the computing device 2600 may be used to implement any of the devices or systems illustrated and described above, such as one of more nodes or servers or other electronic devices for implementing one or more transactions. Thus, computing device 2600 may be a portable computing device, a personal computer, or any electronic computing device. As shown in FIG. 13, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilize multiple busses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 13 is intended only as a specific example for purposes of illustrating the preferred embodiment of the device. Many other configurations having more or fewer components than the system depicted in FIG. 13 are possible.

Scope

It should be noted that the above-mentioned embodiments illustrate rather than limit the disclosure, and that those skilled in the art will be capable of designing many alternative embodiments without departing from the scope of the disclosure as defined by the appended claims.

In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The disclosure may be implemented by means of hardware comprising several distinct elements, and by means of a suitably programmed computer. In a device claim enumerating several means, several of these means may be embodied by one and the same item of hardware. The mere fact that certain features are recited in mutually different dependent claims does not indicate that a combination of these measures cannot be used to advantage.

Enumerated Example Embodiments

1. A computer-implemented method for exchanging blockchain transactions between n>2 participants and subsequently broadcasting the blockchain transactions over a blockchain network for storage on a blockchain, the computer-implemented method comprising:

generating and exchanging cryptographic keys and associated blockchain addresses between participants;

modifying each of the blockchain transactions to be exchanged between participants by including a refund output in each blockchain transaction to be claimed by the participant in charge of broadcasting the transaction;

constructing one or more deposit transactions using the cryptographic keys and the associated blockchain addresses and submitting the one or more deposit transactions to the blockchain, the one or more deposit transactions being constructed to refund a participant who correctly broadcasts another participants blockchain transaction and compensate a participant if their blockchain transaction is not correctly broadcast;

signing and exchanging the modified blockchain transactions between the participants;

constructing refund transactions using for inputs the outputs of the one or more deposit transactions and the refund outputs of the modified blockchain transactions;

constructing compensation transactions using for inputs the outputs of the one or more deposit transactions;

broadcasting the compensation transactions and the modified blockchain transactions; and broadcasting the refund transactions upon confirmation of the modified blockchain transactions on the blockchain, wherein if a participant's modified blockchain transaction is not confirmed on the blockchain the participant claims an associated unspent output in the compensation transaction.

2. A computer-implemented method according to clause 1, wherein generating and exchanging cryptographic keys and associated blockchain addresses between participants comprises:

each participant $U_i$ generates two private-public key pairs $(k_i^1, P_i^1)$ and $(k_i^2, P_i^2)$;

the participants are randomised to realise an ordered set $\{U_0, U_1, \ldots, U_{n-2}, U_{n-1}\}$;

each participant $U_i$ exchanges the two public keys, $P_i^1$ and $P_i^2$, with two other participants ($U_{n-1}$ and $U_{n+1}$);

each participant $U_i$ creates a pair of blockchain addresses $(\alpha_i, \beta_i)$ using their public keys, $P_i^1$ and $P_i^2$, and the ones provided by the two other participants; and each participant $U_i$ exchanges the pair of blockchain addresses $(\alpha_i, \beta_i)$ with the two other participants.

3. A computer-implemented method according to clause 1 or 2, wherein one of the blockchain addresses $(\alpha_i)$ created by each participant requires a signature from both the participant $(U_i)$ and another participant $(U_{i+1})$.

4. A computer-implemented method according to any preceding clause, wherein one of the blockchain addresses $(\beta_i)$ created by each participant $(U_i)$ requires only a signature from another participant $(U_{i-1})$.

5. A computer-implemented method according to any preceding clause, wherein each participant $U_i$ generates a private-public key pair $(y_i, Q_i)$ and publishes the public key, the participants being able to communicate with each other via an encrypted channel using the key pair $(y_i, Q_i)$.

6. A computer-implemented method according to any preceding clause, wherein the one or more deposit transactions are constructed such that outputs of the one or more deposit transactions are shuffled or randomized relative to inputs of the one or more deposit transactions.

7. A computer-implemented method according to any preceding clause, wherein the participants make their deposit in a common deposit transaction.

8. A computer-implemented method according to any one of clauses 1 to 6, wherein each participant creates an individual deposit transaction.

9. A computer-implemented method according to any preceding clause, wherein the deposit transactions are Pay To Script Hash (P2SH) deposit transactions.

10. A computer-implemented method according to any preceding clause, wherein each deposit is constructed such that it is sent to one of the blockchain addresses generated and exchanged by the participants or, after a time $\Delta T_E$, to a blockchain address of the participant who made the deposit if their blockchain transaction is not confirmed on the blockchain.

11. A computer-implemented method according to any preceding clause,
wherein the deposit transaction for the participants is constructed by one of the participants.

12. A computer-implemented method according to any preceding clause,
wherein modifying each of the blockchain transactions to be exchanged comprises locking the refund output under the public key provided by another participant and the modified transaction is signed and sent to said other participant.

13. A computer-implemented method according to any preceding clause,
wherein each participant $U_i$ constructs their refund transaction $R_x^i$ using for inputs the output $O_i$ in the one or more deposit transactions and the refund output sent to the public address $\beta_{i-1}$ in the blockchain transaction $T_x^{i-1}$ generated by participant $U_{i-1}$ such that participant $U_i$'s refund will inherently depend on them submitting participant $U_{i-1}$'s blockchain transaction $T_x^{i-1}$ for inclusion into the blockchain.

14. A computer-implemented method according to clause 13,
wherein the two inputs in the newly created transaction $R_x^i$ require the signature of $U_i$ and $U_{i-1}$ as follows:
input x ($O_i$) requires the signature of participant $U_i$ and participant $U_{i-1}$; and
input d ($\beta_{i-1}$) only requires the signature of $U_i$.

15. A computer-implemented method according to clause 13 or 14,
wherein participant $U_i$ sends their refund transaction $R_x^i$ to participant $U_{i-1}$ who signs it and sends it back to participant $U_i$ who also then signs the transaction $R_x^i$.

16. A computer-implemented method according to any preceding clause,
wherein each participant $U_i$ constructs their compensation transactions $C_x^i$ using the output sent to $O_{i+1}$ in the one or more deposit transactions and participant $U_i$ sends the newly created transaction $C_x^i$ to participant $U_{i+1}$ who signs it and return it to participant $U_i$ where input x ($O_{i+1}$) in $C_x^i$ requires the signature of both $U_i$ and $U_{i+1}$.

17. A computer-implemented method according to any preceding clause,
wherein the compensation transactions have outputs which are locked for a time $\Delta T_S$ that defines the maximum time allowed for the participants to broadcast the exchanged blockchain transactions and see these confirmed on the blockchain network.

18. A computer-implemented method according to any preceding clause,
wherein broadcasting the compensation transactions and the blockchain transactions comprises each participant $U_i$ broadcast two transactions $C_x^i$ and $T_x^{i-1}$ in that order.

19. A computer-implemented method according to any preceding clause,
wherein broadcasting the refund transactions upon confirmation of the blockchain transactions on the blockchain comprises each participant $U_i$ broadcasting refund transaction $R_x^i$ thereby claiming their deposit.

20. A computer-implemented method according to any preceding clause,
wherein a participant can only claim the unspent output in the compensation transaction when their blockchain transaction is not confirmed on the blockchain after a time $\Delta T_S$.

21. A computer readable storage medium comprising computer-executable instructions which, when executed, configure one or more processors to perform the method of any one of clauses 1 to 20.

22. An electronic device comprising:
an interface device;
one or more processor(s) coupled to the interface device;
a memory coupled to the one or more processor(s), the memory having stored thereon computer executable instructions which, when executed, configure the one or more processor(s) to perform the method of any one of clauses 1 to 20.

23. A node of a blockchain network, the node configured to perform the method of any one of clauses 1 to 20.

References

1. Venkatakrishnan, S. B., Fanti, G. and Viswanath, P., 2017. Dandelion: Redesigning the Bitcoin Network for Anonymity. arXiv preprint arXiv:1701.04439. https://arxiv.org/pdf/1701.04439.pdf
2. Biryukov, A., Khovratovich, D., & Pustogarov, I. (2014, November). Deanonymisation of clients in Bitcoin P2P network. In Proceedings of the 2014 ACM SIGSAC Conference on Computer and Communications Security (pp. 15-29). ACM. https://arxiv.org/pdf/1405.7418.pdf
3. Dingledine, R., Mathewson, N., & Syverson, P. (2004). Tor: The second-generation onion router. Naval Research Lab Washington DC.
4. Ron, D., & Shamir, A. (2013, April). Quantitative analysis of the full bitcoin transaction graph. In International Conference on Financial Cryptography and Data Security (pp. 6-24). Springer, Berlin, Heidelberg.
5. Chakravarty, S., Stavrou, A., & Keromytis, A. D. (2008, November). Identifying proxy nodes in a Tor anonymization circuit. In Signal Image Technology and Internet Based Systems, 2008. SITIS'08. IEEE International Conference on (pp. 633-639). IEEE. http://www.cs.columbia.edu/~sc2516/papers/septis_paper.pdf
6. Shah, D., & Zaman, T. (2012, June). Rumor centrality: a universal source detector. In ACM SIGMETRICS Performance Evaluation Review (Vol. 40, No. 1, pp. 199-210). ACM. ftp://ftp-sop.inria.fr/maestro/Sigmetrics-Performance-2012-papers-and-posters/p199.pdf
7. Shah, D., & Zaman, T. (2011). Rumors in a network: Who's the culprit? IEEE Transactions on information theory, 57(8), 5163-5181. http://snap.stanford.edu/nipsgraphs2009/papers/zaman-paper.pdf
8. https://news.bitcoin.com/dandelion-bitcoin-anonymize-transaction-broadcasts/

The invention claimed is:

1. A computer-implemented method for exchanging blockchain transactions between n>2 participants and subsequently broadcasting the blockchain transactions over a blockchain network for storage on a blockchain, the computer-implemented method comprising:
generating and exchanging cryptographic keys and associated blockchain addresses between participants;
modifying each of the blockchain transactions to be exchanged between participants by including a refund output in each blockchain transaction to be claimed by the participant in charge of broadcasting the transaction;
constructing one or more deposit transactions using the cryptographic keys and the associated blockchain addresses and submitting the one or more deposit transactions to the blockchain, the one or more deposit transactions being constructed to refund a participant who correctly broadcasts another participants blockchain transaction and compensate a participant if their blockchain transaction is not correctly broadcast;
signing and exchanging the modified blockchain transactions between the participants;
constructing refund transactions using for inputs the outputs of the one or more deposit transactions and the refund outputs of the modified blockchain transactions;
constructing compensation transactions using for inputs the outputs of the one or more deposit transactions;
broadcasting the compensation transactions and the modified blockchain transactions; and
broadcasting the refund transactions upon confirmation of the modified blockchain transactions on the blockchain, wherein if a participant's modified blockchain transaction is not confirmed on the blockchain the participant claims an associated unspent output in the compensation transaction.

2. The computer-implemented method according to claim 1, wherein generating and exchanging cryptographic keys and associated blockchain addresses between participants comprises:
each participant $U_i$ generates two private-public key pairs $(k_i^1, P_i^1)$ and $(k_i^2, P_i^2)$;
the participants are randomised to realise an ordered set $\{U_0, U_1, \ldots, U_{n-2}, U_{n-1}\}$;
each participant $U_i$ exchanges the two public keys, $P_i^1$ and $P_i^2$, with two other participants ($U_{n-1}$ and $U_{n+1}$);
each participant $U_i$ creates a pair of blockchain addresses $(\alpha_i, \beta_i)$ using their public keys, $P_i^1$ and $P_i^2$, and the ones provided by the two other participants; and
each participant $U_i$ exchanges the pair of blockchain addresses $(\alpha_i, \beta_i)$ with the two other participants.

3. The computer-implemented method according to claim 1, wherein one of the blockchain addresses $(\alpha_i)$ created by each participant requires a signature from both the participant ($U_i$) and another participant ($U_{i+1}$).

4. The computer-implemented method according to claim 1, wherein one of the blockchain addresses $(\beta_i)$ created by each participant ($U_i$) requires only a signature from another participant ($U_{i-1}$).

5. The computer-implemented method according to claim 1, wherein each participant $U_i$ generates a private-public key pair $(y_i, Q_i)$ and publishes a public key of the private-public key pair, the participants being able to communicate with each other via an encrypted channel using the private-public key pair $(y_1, Q_i)$.

6. The computer-implemented method according to claim 1, wherein the one or more deposit transactions are constructed such that outputs of the one or more deposit transactions are shuffled or randomized relative to inputs of the one or more deposit transactions.

7. The computer-implemented method according to claim 1, wherein the participants make their deposit in a common deposit transaction.

8. The computer-implemented method according to claim 1, wherein each participant creates an individual deposit transaction.

9. The computer-implemented method according to claim 1, wherein the deposit transactions are Pay To Script Hash (P2SH) deposit transactions.

10. The computer-implemented method according to claim 1, wherein each deposit is constructed such that it is sent to one of the blockchain addresses generated and exchanged by the participants or, after a time $\Delta T_E$, to a blockchain address of the participant who made the deposit if their blockchain transaction is not confirmed on the blockchain.

11. The computer-implemented method according to claim 1, wherein the deposit transaction for the participants is constructed by one of the participants.

12. The computer-implemented method according to claim 1, wherein modifying each of the blockchain transactions to be exchanged comprises locking the refund output under a public key provided by another participant and the modified transaction is signed and sent to said other participant.

13. The computer-implemented method according to claim 1, wherein each participant $U_i$ constructs their refund transaction $R_x^i$ using for inputs the output $O_i$ in the one or more deposit transactions and the refund output sent to the public address $\beta_{i-1}$ in the blockchain transaction $T_x^{i-1}$ generated by participant $U_{i-1}$ such that participant $U_i$'s refund will inherently depend on them submitting participant $U_{i-1}$'s blockchain transaction $T_x^{i-1}$ for inclusion into the blockchain.

14. The computer-implemented method according to claim 13, wherein two inputs in the constructed transaction $R_x^i$ require the signature of $U_i$ and $U_{i-1}$ as follows:
input x ($O_i$) requires the signature of participant $U_i$ and participant $U_{i-1}$; and
input d ($\beta_{i-1}$) only requires the signature of $U_i$.

15. The computer-implemented method according to claim 13, wherein participant $U_i$ sends their refund transaction $R_x^i$ to participant $U_{i-1}$ who signs it and sends it back to participant $U_i$ who also then signs the transaction $R_x^i$.

16. The computer-implemented method according to claim 1, wherein each participant $U_i$ constructs their compensation transactions $C_x^i$ using the output sent to $O_{i+1}$ in the one or more deposit transactions and participant $U_i$ sends the constructed transaction $C_x^i$ to participant $U_{i+1}$ who signs it and return it to participant $U_i$ where input x ($O_{i+1}$) in $C_x^i$ requires the signature of both $U_i$ and $U_{i+1}$.

17. The computer-implemented method according to claim 1, wherein the compensation transactions have outputs which are locked for a time $\Delta T_S$ that defines the maximum time allowed for the participants to broadcast the exchanged blockchain transactions and see these confirmed on the blockchain network.

18. The computer-implemented method according to claim 1, wherein broadcasting the compensation transactions and the blockchain transactions comprises each participant $U_i$ broadcast two transactions $C_x^i$ and $T_x^{i-1}$ in that order.

19. The computer-implemented method according to claim 1, wherein broadcasting the refund transactions upon confirmation of the blockchain transactions on the blockchain comprises each participant $U_i$ broadcasting refund transaction $R_x^i$ thereby claiming their deposit.

20. The computer-implemented method according to claim 1, wherein a participant can only claim the unspent output in the compensation transaction when their blockchain transaction is not confirmed on the blockchain after a time $\Delta T_S$.

21. A non-transitory computer-readable storage medium comprising computer-executable instructions which, when executed, configure one or more processors to perform the method of claim 1.

22. An electronic device comprising:
an interface device;
one or more processor(s) coupled to the interface device; and a memory coupled to the one or more processor(s), the memory having stored thereon computer executable instructions which, when executed, configure the one or more processor(s) to perform the method claim 1.

23. A node of a blockchain network, the node configured to perform the method of claim 1.

* * * * *